(12) United States Patent
Crume et al.

(10) Patent No.: US 8,979,993 B2
(45) Date of Patent: *Mar. 17, 2015

(54) CERAMIC COMPOSITIONS FOR INCREASED BATCH FEED RATE

(75) Inventors: Gregg William Crume, Canandaigua, NY (US); Rebecca L. DeRosa, Painted Post, NY (US); Daniel Edward McCauley, Watkins Glen, NY (US); Misty Riesbeck, Lindley, NY (US)

(73) Assignee: Corning Incorporated, Corning, NY (US)

(*) Notice: Subject to any disclaimer, the term of this patent is extended or adjusted under 35 U.S.C. 154(b) by 333 days.

This patent is subject to a terminal disclaimer.

(21) Appl. No.: 13/477,729

(22) Filed: May 22, 2012

(65) Prior Publication Data

US 2012/0302421 A1  Nov. 29, 2012

Related U.S. Application Data

(60) Provisional application No. 61/490,367, filed on May 26, 2011.

(51) Int. Cl.
| | |
|---|---|
| *C04B 35/636* | (2006.01) |
| *C04B 38/00* | (2006.01) |
| *C04B 35/478* | (2006.01) |
| *C04B 35/195* | (2006.01) |
| *C04B 35/18* | (2006.01) |
| *C04B 35/185* | (2006.01) |
| *C04B 35/624* | (2006.01) |
| *C04B 111/00* | (2006.01) |

(52) U.S. Cl.
CPC ....... *C04B 35/478* (2013.01); *C04B 2111/0081* (2013.01); *C04B 35/195* (2013.01); *C04B 2111/00793* (2013.01); *C04B 2235/6021* (2013.01); *C04B 35/18* (2013.01); *C04B 35/185* (2013.01); *C04B 35/624* (2013.01); *C04B 35/6365* (2013.01); *C04B 2235/3208* (2013.01); *C04B 2235/3213* (2013.01); *C04B 2235/3218* (2013.01); *C04B 2235/3227* (2013.01); *C04B 2235/3418* (2013.01); *C04B 38/0006* (2013.01)
USPC ............... 106/172.1; 106/175.1; 106/197.01; 106/198.1

(58) Field of Classification Search
CPC .. C04B 35/6365; C04B 35/18; C04B 35/185; C04B 35/195; C04B 38/0006; C04B 38/02; C04B 2111/0081; C04B 2111/00793; C04B 2235/6021
USPC .................... 106/172.1, 175.1, 197.01, 198.1
See application file for complete search history.

(56) References Cited

U.S. PATENT DOCUMENTS

| | | | |
|---|---|---|---|
| 7,704,296 B2 | 4/2010 | Merkel | ............................ 55/523 |
| 8,641,815 B2 * | 2/2014 | Crume | ...................... 106/162.8 |

(Continued)

OTHER PUBLICATIONS

"Calorimetric Study of Aqueous Solutions of Hydroxypropyl_Cellulose"; Macromolecules 1991, 24, p. 2413-2418; Robitaille et al.

(Continued)

*Primary Examiner* — David M Brunsman
(74) *Attorney, Agent, or Firm* — Charles A. Greene

(57) ABSTRACT

A precursor batch composition that can be used to make porous ceramic articles is provided. The batch composition includes a cellulose-based polymer and, in particular, a methylcellulose showing a specified micro-calorimetry thermal response fingerprint. The methylcellulose can also have a cloud point above a specified temperature.

20 Claims, 7 Drawing Sheets

(56) References Cited

U.S. PATENT DOCUMENTS 8,728,224 B2 * 5/2014 Niinobe .................. 106/197.01
2009/0218711 A1 9/2009 Dasher et al. .................. 264/43

OTHER PUBLICATIONS

"Hydration-dehydration properties of methylcellulose and hydroxypropylemethylcellulose"; Sarkar et al; Carbohydrate Polymers 27 (1995), p. 177-185.

* cited by examiner

CERAMIC COMPOSITIONS FOR INCREASED BATCH FEED RATE

CROSS-REFERENCE TO RELATED APPLICATIONS

This application claims the benefit of priority under 35 U.S.C. §119 of U.S. Provisional Application Ser. No. 61/490,367 filed on May 26, 2011, the content of which is relied upon and incorporated herein by reference in its entirety.

BACKGROUND

The disclosure relates generally to ceramic precursor batch compositions and more particularly to ceramic precursor batch compositions and batches for forming ceramic honeycombs.

In the formation of ceramic bodies, e.g., silicon carbide, cordierite, mullite, alumina, or aluminum titanate bodies, plasticized mixtures of various inorganic powder batches are prepared which are then formed into various shapes. These plasticized mixtures should be well blended and homogeneous in order for the resulting shaped body to have relatively good integrity in both size and shape, and uniform physical properties. These mixtures typically further include organic additives such as binders, plasticizers, surfactants, lubricants, and dispersants as processing aids to enhance cohesion, plasticity, lubricity, and/or wetting, and therefore to produce a more uniform batch.

Cellulose ethers have been used as extrusion binders to impart plasticity while imparting good drying behavior. While other ceramic binder systems can also be used for ceramic extrusion, cellulose ethers such as methylcellulose (MC), hydroxypropylcellulose (HPMC) and hydroxyethylmethylcellulose (HEMC) can form high temperature gels. The gelling behavior facilitates rapid drying while preventing distortions that can occur with other binder systems as they are heated.

In order to form the batches described above into various shapes, the batch materials are usually fed through an extruder. The rate at which the batch materials can be fed through the extruder is limited in part by the $T_{onset}$ of the batch. $T_{onset}$ refers to the temperature at which the rheology of the batch begins to transition from low to high viscosity. Higher $T_{onset}$ can enable greater batch feed rate and higher batch feed rate can result in reduced processing costs.

SUMMARY

One embodiment of the disclosure relates to a ceramic precursor batch composition. The ceramic precursor batch composition includes inorganic ceramic-forming ingredients and a cellulose-based polymer. The cellulose-based polymer includes a methylcellulose showing a micro-calorimetry thermal response comprising, upon dehydration, at least one endothermic peak above a gelation onset temperature. The at least one peak comprises a peak having a maximum intensity at a temperature of at least 69° C.

Another embodiment of the disclosure relates to a ceramic precursor batch composition. The ceramic precursor batch composition includes inorganic ceramic-forming ingredients and a cellulose-based polymer. The cellulose-based polymer includes a methylcellulose showing a micro-calorimetry thermal response comprising, upon rehydration, at least one exothermic peak below a transition onset temperature.

Another embodiment of the disclosure relates to a ceramic precursor batch composition. The ceramic precursor batch composition includes inorganic ceramic-forming ingredients and a cellulose-based polymer. The cellulose-based polymer includes a methylcellulose having a cloud point above 62° C.

Another embodiment of the disclosure relates to a method of producing a ceramic precursor batch composition. The method includes compounding inorganic ceramic-forming ingredients and a cellulose-based polymer. The cellulose-based polymer includes a methylcellulose showing a micro-calorimetry thermal response comprising, upon dehydration, at least one endothermic peak above a gelation onset temperature. The at least one peak comprises a peak having a maximum intensity at a temperature of at least 69°.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
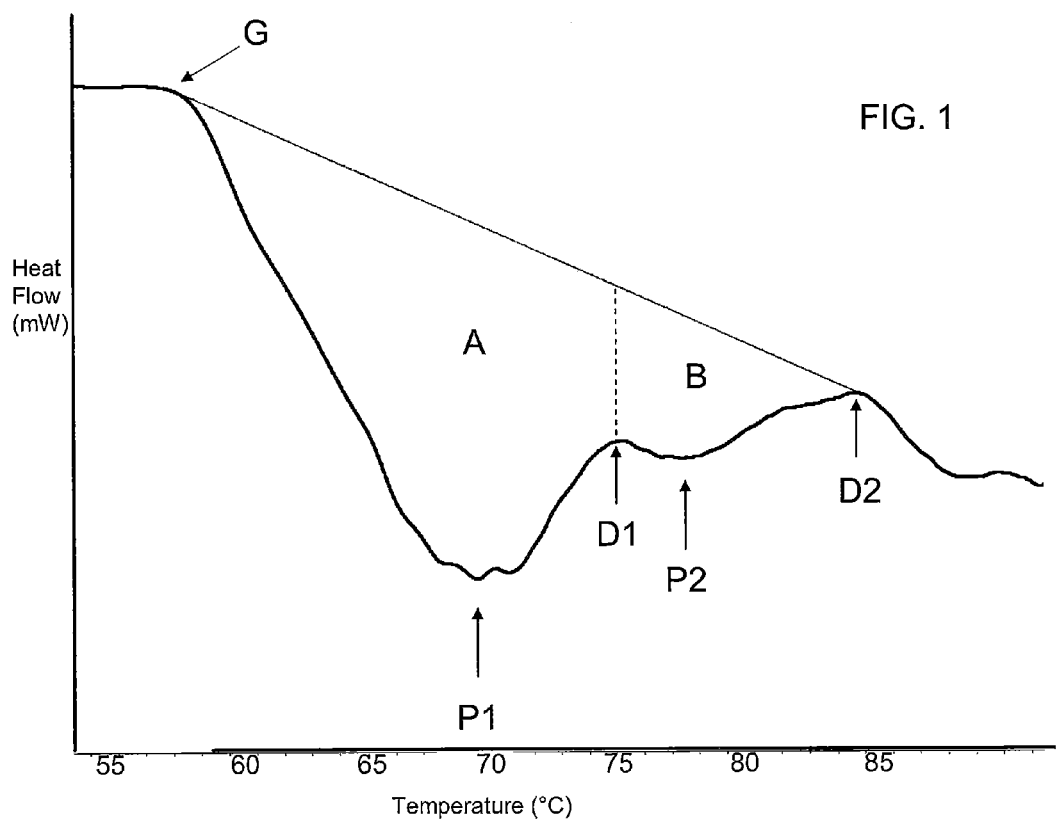
FIG. 1 plots a micro-calorimetry dehydration thermal response fingerprint for a cellulose-based polymer using the micro-calorimetry test method disclosed herein.

Various embodiments of the disclosure will be described in detail with reference to the drawings, if any.

"Micro-calorimetry thermal response" refers to the thermal response of a material subjected to the micro-calorimetry test method described herein.

"Gelation onset temperature" refers to the temperature at which, when a material is subjected to the micro-calorimetry test method described herein, the material begins to exhibit an endothermic response upon heating, indicating the onset of transformation of the material from a hydrophilic solute to a hydrophobic gel.

"$T_{onset}$" refers to the temperature at which the rheology of the batch begins to transition from low to high viscosity. When referenced herein, $T_{onset}$ was determined by using a temperature sweep in a capillary rheometer, where the value was defined as the temperature at which the capillary pressure increases by 15% above the stable baseline pressure during extrusion through a zero length capillary die.

"Cloud point" refers to the temperature at which dissolved solids in a solution are no longer completely soluble and precipitate as a second phase giving the solution a cloudy appearance as determined by the cloud point test method described herein.

"Methylcellulose" refers to a class of cellulose-based polymers that are cellulose ethers having at least some degree of methoxy substitution and may also optionally have additional molar substitution, such as hydroxypropyl substitution to form hydroxypropyl methylcellulose (HPMC).

"Methoxy degree of substitution" is the average number of methoxy groups attached per anhydroglucose unit of a cellulose-based polymer.

"Hydroxypropyl molar substitution" is the number of moles of hydroxypropyl groups per molecule of anhydroglucose in a cellulose-based polymer.

Compositions disclosed herein can, in exemplary embodiments, have a higher $T_{onset}$. For example, ceramic precursor batch compositions can have a $T_{onset}$ of at least 34° C. such as at least 34.5° C., and further such as at least 35° C., such as from 34° C. to 38° C., and further such as from 34.5° C. to 37.5° C., and yet further such as from 35° C. to 37° C.

Compositions disclosed herein comprise inorganic-ceramic forming ingredients as well as organic ingredients or additives, wherein the organic ingredients or additives include at least one cellulose-based polymer.

The inorganic ceramic-forming ingredients may be synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the ceramic body.

In one set of exemplary embodiments, the inorganic ceramic-forming ingredients may yield an aluminum-titanate ceramic material upon firing. In other exemplary embodiments, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight.

One composition, by way of a non-limiting example, which ultimately forms cordierite upon firing is as follows in percent by weight: about 33-41, such as about 34-40 of aluminum oxide, about 46-53 such as about 48-52 of silica, and about 11-17 such as about 12-16 magnesium oxide.

The at least one cellulose-based polymer, which can act as a binder in the compositions disclosed herein, in at least one set of embodiments, comprises a methylcellulose showing a micro-calorimetry thermal response comprising, upon dehydration, at least one endothermic peak above a gelation onset temperature, wherein the at least one peak comprises a peak having a maximum intensity at a temperature of at least 69° C.

The methylcellulose can also show a micro-calorimetry thermal response comprising, upon rehydration, at least one exothermic peak below a transition onset temperature, such as a single peak having a maximum intensity of at least 48° C.

The methylcellulose can also have a cloud point above 62° C., such as above 62.5° C., and further such as above 63° C., including a cloud point between 62° C. and 65° C.

In one set of exemplary embodiments, the methylcellulose is a hydroxypropyl methylcellulose (HPMC).

The hydroxypropyl methylcellulose (HPMC) can, for example, have a methoxy degree of substitution from about 1.6 to 2.0, such as from about 1.7 to 1.9, including about 1.8, and a hydroxypropyl molar substitution from about 0.10 to 0.25, such as from about 0.12 to 0.20, including about 0.13. Examples of hydroxypropyl methylcellulose include, but are not limited to F-type HPMC available from Dow Chemical as F240, SE-Tylose product Metalose MOB 20000 P4, and Aqualon product Cuminal MHPC 20000 PFF.

The cellulose-based polymer can be present in the ceramic precursor batch composition in an amount of at least 1.0% on a weight percent by super addition basis, such as an amount ranging from about 1.0% to about 6.0% on a weight percent by super addition basis, and further such as an amount ranging from about 2.0% to about 5.0%, on a weight percent by super addition basis.

In exemplary embodiments at least 50%, such as at least 60%, and further such as at least 70%, and still further such as at least 80%, and yet still further such as at least 90%, and even further such as at least 95%, and yet even further such as at least 98%, and still yet even further such as at least 99% of the total amount of cellulose-based polymer in the ceramic precursor batch composition is a cellulose-based polymer comprising a methylcellulose, such as hydroxypropyl methylcellulose (HPMC), showing a micro-calorimetry thermal response comprising, upon dehydration, at least one endothermic peak above a gelation onset temperature, wherein the at least one peak comprises a peak having a maximum intensity at a temperature of at least 69° C.

In exemplary embodiments at least 50%, such as at least 60%, and further such as at least 70%, and still further such as at least 80%, and yet still further such as at least 90%, and even further such as at least 95%, and yet even further such as at least 98%, and still yet even further such as at least 99% of the total amount of cellulose-based polymer in the ceramic precursor batch composition is a cellulose-based polymer comprising a methylcellulose, such as hydroxypropyl methylcellulose (HPMC), showing a micro-calorimetry thermal response comprising, upon rehydration, at least one exothermic peak below a transition onset temperature, wherein the at least one peak comprises a peak having a maximum intensity at a temperature of at least 48° C.

In exemplary embodiments at least 50%, such as at least 60%, and further such as at least 70%, and still further such as at least 80%, and yet still further such as at least 90%, and even further such as at least 95%, and yet even further such as at least 98%, and still yet even further such as at least 99% of the total amount of cellulose-based polymer in the ceramic precursor batch composition is a cellulose-based polymer comprising a methylcellulose, such as hydroxypropyl methylcellulose (HPMC), having a cloud point above 62° C.

In exemplary embodiments, the ceramic precursor batch composition comprises inorganic ceramic-forming ingredients and a cellulose-based polymer, wherein essentially all of the cellulose-based polymer in the composition is a methylcellulose, such as hydroxypropyl methylcellulose (HPMC), showing a micro-calorimetry thermal response comprising, upon dehydration, at least one endothermic peak above a gelation onset temperature, wherein the at least one peak comprises a peak having a maximum intensity at a temperature of at least 69° C. Essentially all of the cellulose-based polymer in the composition may also be a methylcellulose, such as HPMC, showing a micro-calorimetry thermal response comprising, upon rehydration, at least one exothermic peak below a transition onset temperature, wherein the at least one peak comprises a peak having a maximum intensity at a temperature of at least 48° C. Essentially all of the cellulose-based polymer in the composition may also be a methylcellulose, such as HPMC, having a cloud point above 62° C.

In exemplary embodiments, the ceramic precursor batch composition comprises inorganic ceramic-forming ingredients and a cellulose-based polymer, wherein the cellulose-based polymer consists essentially of a methylcellulose, such as hydroxypropyl methylcellulose (HPMC), showing a micro-calorimetry thermal response comprising, upon dehydration, at least one endothermic peak above a gelation onset temperature, wherein the at least one endothermic peak comprises a peak having a maximum intensity at a temperature of at least 69° C.

In exemplary embodiments, the ceramic precursor batch composition comprises inorganic ceramic-forming ingredients and a cellulose-based polymer, wherein the cellulose-based polymer consists essentially of a methylcellulose, such as hydroxypropyl methylcellulose (HPMC), showing a micro-calorimetry thermal response comprising, upon rehydration, at least one exothermic peak below a transition onset temperature, wherein the at least one peak comprises a peak having a maximum intensity at a temperature of at least 48° C.

In exemplary embodiments, the ceramic precursor batch composition comprises inorganic ceramic-forming ingredients and a cellulose-based polymer, wherein the cellulose-based polymer consists essentially of a methylcellulose, such as hydroxypropyl methylcellulose (HPMC), having a cloud point above 62° C.

Compositions disclosed herein can also include at least one solvent. The solvent may provide a medium for the cellulose-based polymer to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. Typically, the amount of aqueous solvent may be from about 18% by weight to about 50% by weight, on a weight percent by super addition basis.

Compositions disclosed herein can also comprise at least one kosmotropic agent, such as a salt. The kosmotropic agent, such as a salt, can be present with the cellulose-based polymer (for example, in a system containing the cellulose-based polymer and a solvent) before the cellulose-based polymer is mixed with the other batch ingredients or the salt can be added as a separate ingredient or both. Examples of salts that can be used include sodium chloride, magnesium chloride, ferric chloride, sodium sulfate, aluminum sulfate, sodium carbonate, and sodium phosphate.

In certain exemplary embodiments, the at least one salt may be present in a solvent system containing cellulose-based polymers, such as HPMC. For example, the at least one salt can be present in the solvent system in a molar concentration of no greater than $1 \times 10^{-3}$, such as a molar concentration of from $0.01 \times 10^{-3}$ to $1 \times 10^{-3}$, including a molar concentration of from $0.05 \times 10^{-3}$ to $0.5 \times 10^{-3}$.

In certain exemplary embodiments, the at least one salt can be present in the solvent system containing cellulose-based polymers, such as HPMC, in a molar concentration of less than $0.01 \times 10^{-3}$. In certain exemplary embodiments, the solvent system containing cellulose-based polymers is essentially salt free.

Applicants have surprisingly found that when the salt content of a solvent system containing cellulose-based polymers, such as HPMC, is kept as low as possible, it can be easier to identify whether or not the cellulose-based polymers will correlate to a resulting ceramic precursor batch composition having sufficiently high $T_{onset}$.

The ceramic precursor batch composition may further comprise other additives such as surfactants, oil lubricants and pore-forming material. Non-limiting examples of surfactants that may be used in certain exemplary embodiments include $C_8$ to $C_{22}$ fatty acids and/or their salts or derivatives. Additional surfactant components that may be used with these fatty acids include $C_8$ to $C_{22}$ fatty esters, $C_8$ to $C_{22}$ fatty alcohols, and combinations of these. Exemplary surfactants include stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. The amount of surfactants typically may be from about 0.25% by weight to about 2% by weight, on a weight percent by super addition basis.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight, on a weight percent by super addition basis. In an exemplary embodiment, the oil lubricants may be present from about 3% by weight to about 6% by weight, on a weight percent by super addition basis.

In filter applications, such as in diesel particulate filters, it may be desirable to include a pore forming material in the mixture in an amount effective to subsequently obtain the porosity required for efficient filtering. Examples of pore forming materials include particulate substances (not binders) that burn out of the green body in the firing step. Other pore forming materials do not burn out in the firing step. Some types of pore forming materials that may be used, although it is to be understood that embodiments herein are not limited to these, include non-waxy organics that are solid at room temperature, elemental carbon, and combinations of these. Some examples may be graphite, starch, cellulose, flour, etc. In one exemplary embodiment, the pore forming material may be elemental carbon. In another exemplary embodiment, the pore forming material may be graphite, which may have the least adverse effect on the processing. In an extrusion process, for example, the rheology of the mixture may be good when graphite is used. The pore forming material may be up to about 60% by weight as a superaddition. Typically, the amount of graphite may be from about 1% to about 50%, such as from about 3% to about 30% by weight based on the inorganic ceramic-forming ingredients. If a combination of graphite and flour are used, the amount of pore forming material may be typically from about 1% by weight to about 25% by weight with the graphite at 5% by weight to 10% of each and the flour at 5% by weight to about 10% by weight.

The disclosure also provides a method of producing a ceramic honeycomb body, comprising the steps of compounding inorganic ceramic-forming ingredients and a cellulose-based polymer, among other ingredients. The ingredients may be mixed in a muller or plow blade mixer. A solvent may be added in an amount that is less than is needed to plasticize the batch. With water as the solvent, the water hydrates the binder and the powder particles. The surfactant and/or oil lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, surfactant, oil lubricant and the inorganics), temperature of the components, the amount of work put in to the batch, the shear rate, and extrusion velocity. During plasticization, the binder dissolves in the solvent and a high viscosity fluid phase is formed. The binder formed is stiff because the system is very solvent-deficient. The surfactant enables the binder phase to adhere to the powder particles.

In a further step, the composition may be extruded to form a green honeycomb body. Extrusion may be done with devices that provide low to moderate shear. For example hydraulic ram extrusion press or two stage de-airing single auger are low shear devices. A single screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, may be those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses may be from about 0.07 to about 0.6 mm (about 3 to about 25 mils), including from about 0.18 to 0.33 mm (about 7 to about 13 mils), although thicknesses of about 0.02-0.048 mm (1-2 mils) are also possible. Methods disclosed herein may be especially suited for extruding thin wall/high cell density honeycombs.

The extrudates may then be dried and fired according to known techniques. The firing conditions of temperature and time may depend on the composition and size and geometry of the body, and embodiments herein are not limited to specific firing temperatures and times. For example, in compositions which are primarily for forming cordierite, the temperatures may typically be from about 1300° C. to about 1450° C., and the holding times at these temperatures may be from about 1 hour to about 6 hours. For mixtures that are primarily for forming mullite, the temperatures may be from about 1400° C. to about 1600° C., and the holding times at these temperatures may be from about 1 hour to about 6 hours. For cordierite-mullite forming mixtures which yield the previously described cordierite-mullite compositions, the temperatures may be from about 1375° C. to about 1425° C. For mixtures that are primarily for forming aluminum titanate, the temperatures may be from about 1350° C. to about 1500° C. and the holding times at these temperatures may be from about 10 hours to about 20 hours. Firing times depend on factors such as kinds and amounts of materials and nature of equipment but typical total firing times may be from about 20 hours to about 80 hours. For metal bodies, the temperatures may be about 1000° C. to 1400° C. in a reducing atmosphere preferably hydrogen. Firing times depend on factors as discussed above but may be typically at least 2 hours and typically about 4 hours. For zeolite bodies, the temperatures may be about 400° C. to 1000° C. in air. Firing times depend on factors as discussed above but may be typically about 4 hours.

Methods Used to Characterize Cellulose-Based Polymers
Micro-Calorimetry Test Method The following micro-calorimetry test method was used to determine the micro-calorimetry thermal response of cellulose-based polymers described herein. HPMC was the cellulose-based polymer used in the test method. The test method, which is a type of solution micro-calorimetry method, is a sensitive analytical technique used to measure the endothermic heat of de-hydration for HPMC upon heating. Under heating, HPMC undergoes dehydration and eventually gelation, which is captured by an endothermic response in the micro-calorimeter. The endothermic peak(s) is the response due to the thermal transition of HPMC from a hydrophilic solute to a hydrophobic gel. Upon cooling, HMPC undergoes rehydration, which is captured by an exothermic response in the micro-calorimeter. The exothermic peak is the response due to the thermal transition of HPMC from a hydrophobic gel to a hydrophilic solute.

The micro-calorimetry test method is performed by first preparing a 0.5 weight percent aqueous solution of HPMC using a standard method of heating ultra-pure water (18.2 MΩ) to 90° C. and dispersing the needed amount of HPMC into the hot water to create a suspension. The suspension is slowly cooled to room temperature while stirring to create a homogenous solution. The solution is stored in a refrigerated environment for at least 48 hours to ensure complete hydration of the HPMC molecules. The solution is removed from the refrigerator several hours prior to μ-DSC testing to equilibrate the solution temperature to room temperature. Upon equilibrating to room temperature, a sample is prepared specific to the calorimeter used and tested. Our standard testing parameters are an isothermal hold at 26° C. for 20 minutes followed by a temperature ramp at 0.7° C./minute from 26 to 100° C. Then a cooling profile is used from 100 to 26° C. at 0.7° C./min. Both endothermic de-hydration and exothermic re-hydration events are recorded.

An endothermic dehydration event or endothermic response upon heating is a micro-calorimetry thermal response having a fingerprint that includes at least one "peak" using the above-described test method. The endothermic response begins when the temperature of the solution reaches the gelation onset temperature. At temperatures below the gelation onset temperature, the solution in the above-described test method exhibits an approximately constant increase in temperature per amount of heat added to the solution. At the gelation onset temperature and in a temperature range above it, the solution temperature increase per the amount of heat added deviates from that observed below the gelation onset temperature. A temperature above the gelation onset temperature at which this deviation reaches a localized maximum is a peak at its maximum intensity.

A micro-calorimetry dehydration thermal response fingerprint from the above-described test method can include just a single peak or it can include more than one peak. When having more than one peak, the first peak maximum intensity occurs at the temperature above the gelation onset temperature at which the above-described deviation first reaches a localized maximum. In a temperature range above this first peak maximum intensity temperature, the above-described deviation decreases to a localized minimum, referred to as the dividing point between the first and second peaks. In a temperature range above the dividing point between the first and second peaks, the above-described deviation increases to a second localized maximum. The second peak maximum intensity occurs at the temperature of this second localized maximum.

The phenomenon of one or more peaks occurring in a micro-calorimetry thermal response fingerprint can, perhaps, best be illustrated graphically. FIG. 1 illustrates a micro-calorimetry dehydration thermal response fingerprint from the above-described test method, wherein the micro-calorimetry thermal response includes first and second peaks above the gelation onset temperature. In FIG. 1, gelation onset temperature is indicated by G, first peak maximum intensity temperature is indicated by P1, the dividing point between first and second peaks is indicated by D1, second peak maximum intensity temperature is indicated by P2, and high temperature point of second peak regime is indicated by D2.

The first and second peaks described above can also be characterized by their peak areas. In FIG. 1, the first peak area can be characterized as the area indicated by A and the second peak area can be characterized as the area indicated by B. Each of first and second peak areas can be determined, for example, by using an integration algorithm.

An exothermic rehydration event or exothermic response upon cooling is a micro-calorimetry thermal response having a fingerprint that includes at least one "peak" using the above-described test method. The exothermic response begins when the temperature of the solution reaches the transition onset temperature, which is when the micro-calorimetry thermal response exhibits a transition from a gelled state to a soluble state. At temperatures above the transition onset temperature, the solution in the above-described test method exhibits an approximately constant decrease in temperature per amount of heat removed from the solution. At the transition onset temperature and in a temperature range below it, the solution temperature decrease per the amount of heat removed deviates from that observed above the transition onset temperature. A temperature below the transition onset temperature at which this deviation reaches a localized maximum is a peak at its maximum intensity.

Figure 4:
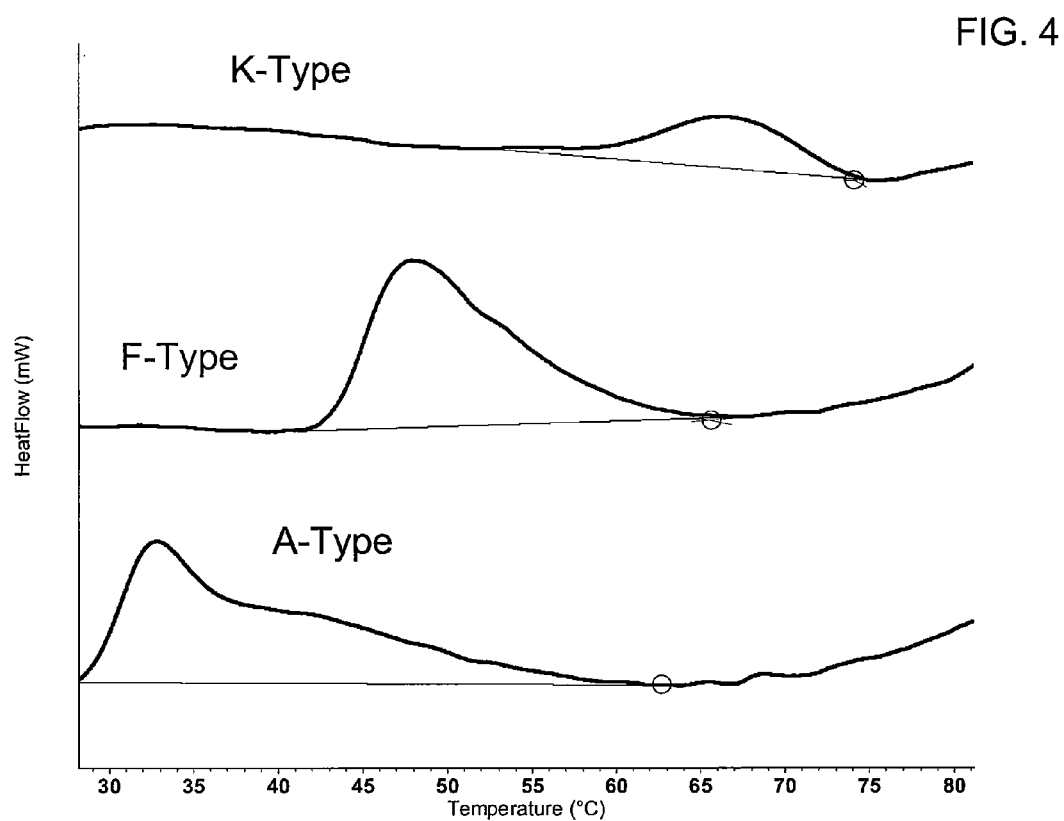
FIG. 4 plots micro-calorimetry rehydration thermal response fingerprints for cellulose based-polymers using the micro-calorimetry test method disclosed herein.

FIG. 4 plots micro-calorimetry rehydration thermal response fingerprints for three cellulose based-polymers, K-type HPMC, F-type HPMC, and A-type HPMC, using the micro-calorimetry test method disclosed herein.

Cloud Point Test Method

The cloud point test method is performed by first preparing a 0.5 weight percent aqueous solution of HPMC using a standard method of heating water to 90° C. and dispersing the needed amount of HPMC into the hot water to create a suspension. The suspension is stirred for at least 20 minutes at 400 RPMs in ice water after which the sample is visually inspected for bubbles and transferred into a capillary tube and inserted into the cloud point unit, which is a Mettler Toledo FP900 Thermo System using an FP81C cloud point cell. The sample is then heated from about 40° C. to about 90° C. at a rate of 2° C. per minute. Cloud point is a measurement of light transmitted through the sample as a function of temperature. As the solution precipitates as the temperature increases, it becomes progressively more cloudy and the transmitted light progressively decreases. Examples of this phenomenon are graphically illustrated in FIGS. 6-7, which plot curves used to determine cloud points for two different cellulose-based polymers. The cloud point for each cellulose-based polymer is identified as the inflection point of the curve for that polymer and is quantified as the minimum of the derivative of the curve.

Applicants have surprisingly found that certain ceramic precursor batch compositions having certain cellulose-based polymers included as a binder material can exhibit increased $T_{onset}$. Specifically, applicants have found that when methylcellulose, and particularly hydroxypropyl methylcellulose (HPMC), showing a micro-calorimetry thermal response comprising, upon dehydration, at least one endothermic peak above a gelation onset temperature, wherein the at least one peak comprises a peak having a maximum intensity at a temperature of at least 69° C. is used, increased $T_{onset}$ can be achieved. In addition, applicants have found that when methylcellulose, and particularly HPMC, showing a micro-calorimetry thermal response comprising, upon rehydration, at least one exothermic peak below a transition onset temperature is used, such as a single peak having a maximum intensity at a temperature of at least 48° C., increased $T_{onset}$ can be achieved. Applicants have also found that increased $T_{onset}$ can be achieved when methylcellulose, and particularly HPMC, having a cloud point above 62° C. is used.

In certain exemplary embodiments, upon dehydration, the micro-calorimetry thermal response exhibits a gelation onset temperature of at least 58° C., such as from about 58° C. to about 60° C. In certain exemplary embodiments, the micro-calorimetry thermal response exhibits a gelation onset temperature of at least 60° C., such as from about 60° C. to about 62° C.

In certain exemplary embodiments, upon dehydration, the at least one peak comprises a peak having a maximum intensity of from about 69° C. to about 74° C. In certain exemplary embodiments, the at least one peak comprises a peak having a maximum intensity of at least 70° C., such as at least 71° C., and further such as at least 72° C.

In certain exemplary embodiments, upon dehydration, the at least one peak comprises a first peak having a maximum intensity of at least 65° C. and a second peak having a maximum intensity of at least 70° C., such as at least 72° C. In such embodiments, the first peak can, for example, have a maximum intensity of from 65° C. to 69° C. and the second peak can, for example, have a maximum intensity of from 70° C. to 74° C.

In certain exemplary embodiments, upon dehydration, the at least one peak does not comprise a peak having a maximum intensity of less than 65° C.

In one set of exemplary embodiments, upon dehydration, the micro-calorimetry thermal response exhibits a gelation onset temperature of at least 60° C. and comprises a single peak having a maximum intensity at a temperature of at least 69° C., such as a gelation onset temperature of between 60° C. and 62° C. and a single peak having a maximum intensity at a temperature of between 69° C. and 71° C.

In another set of exemplary embodiments, upon dehydration, the micro-calorimetry thermal response exhibits a gelation onset temperature of at least 58° C. and comprises dual peaks, the first peak having a maximum intensity at a temperature of at least 65° C. and the second peak having a maximum intensity of at least 72° C., such as a gelation onset temperature of between 58° C. and 60° C., a first peak having a maximum intensity at a temperature of between 65° C. and 67° C. and a second peak having a maximum intensity at a temperature of between 72° C. and 74° C.

In certain exemplary embodiments, such as with F-type HPMC, upon rehydration, the micro-calorimetry thermal response exhibits a transition from a gelled state to a soluble state ("transition onset temperature") of at least 65° C., such as from about 65° C. to about 67° C. and comprises a single peak having a maximum intensity of at least 48° C., such as from about 48° C. to about 50° C.

In certain exemplary embodiments, such as with K-type HPMC, upon rehydration, the micro-calorimetry thermal response exhibits a transition onset temperature of at least 75° C., such as from about 75° C. to about 77° C. and comprises a single peak having a maximum intensity of at least 67° C., such as from about 67° C. to about 69° C.

In certain exemplary embodiments, such as with A-type HPMC, upon rehydration, the micro-calorimetry thermal response exhibits a transition onset temperature of at least at least 62° C., such as from about 62° C. to about 64° C. and comprises a single peak having a maximum intensity of at least 32° C., such as from about 32° C. to about 34° C.

Figure 5:
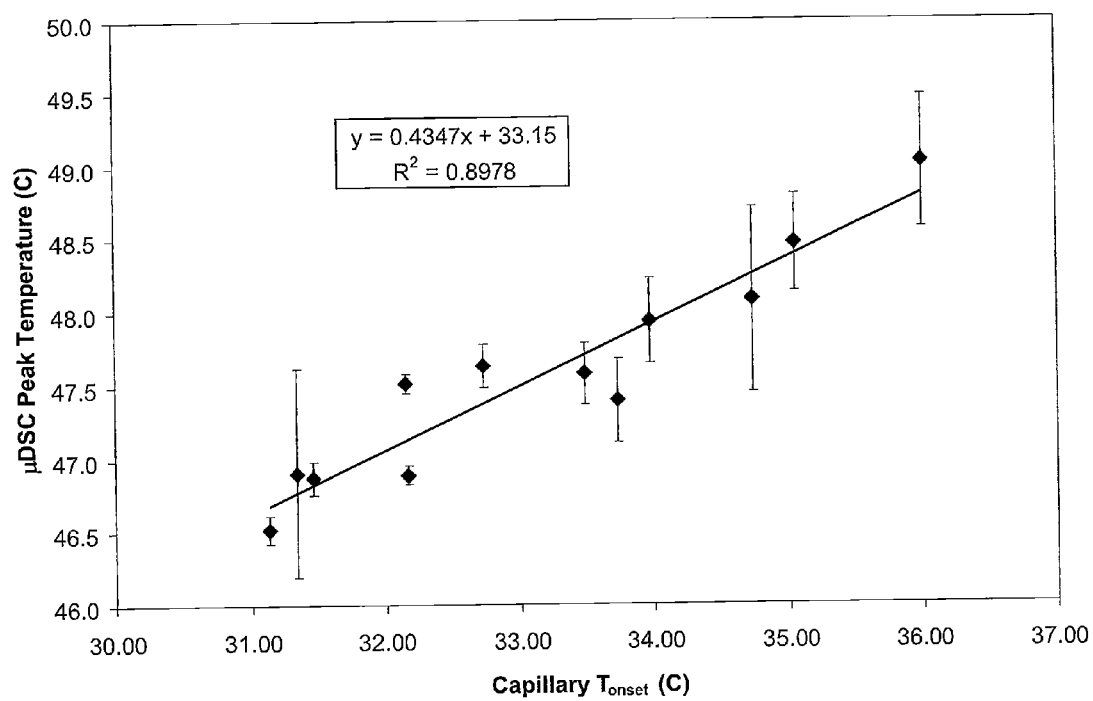
FIG. 5 plots the relationship between peak maximum intensity temperature upon rehydration of a cellulose-based polymer using the micro-calorimetry test method disclosed herein and batch $T_{onset}$.

As discussed above, applicants have surprisingly found a strong correlation between the micro-calorimetry thermal response fingerprint of a given cellulose-based polymer, such as HPMC, and the resulting $T_{onset}$ of a ceramic precursor batch composition containing the cellulose based polymer as an ingredient. FIG. 5 plots the relationship between peak maximum intensity temperature upon rehydration of F-type HMPC using the micro-calorimetry test method disclosed herein and $T_{onset}$ of a resulting ceramic precursor batch composition. As can be seen, a strong linear relationship exists between the peak maximum intensity temperature of the HPMC and $T_{onset}$ of the resulting batch composition. For example, a peak maximum intensity of at least 48° C. strongly correlates to a $T_{onset}$ of at least 34° C.

The disclosure and scope of the appended claims will be further clarified by the following examples.

EXAMPLES

In the examples discussed below, each of the ceramic precursor batch compositions contained ingredients in the amount ranges set forth in Table 1.

TABLE 1

| Inorganic Ingredients | Amount (wt %) |
| --- | --- |
| Silica | 8-12 |
| Strontium carbonate | 5-10 |
| Calcium carbonate | 1-2 |
| Alumina | 45-50 |
| Titanium dioxide | 25-30 |
| Hydrated alumina | 2-5 |
| Lanthanum oxide | 0-1 |

| Superadded Ingredients | Amount (wt % in superaddition basis) |
| --- | --- |
| Graphite | 5-15 |
| Potato starch | 5-15 |
| HPMC | 4-5 |
| Water | 10-20 |
| Tall oil | 1-5 |

Example 1

Figure 2:
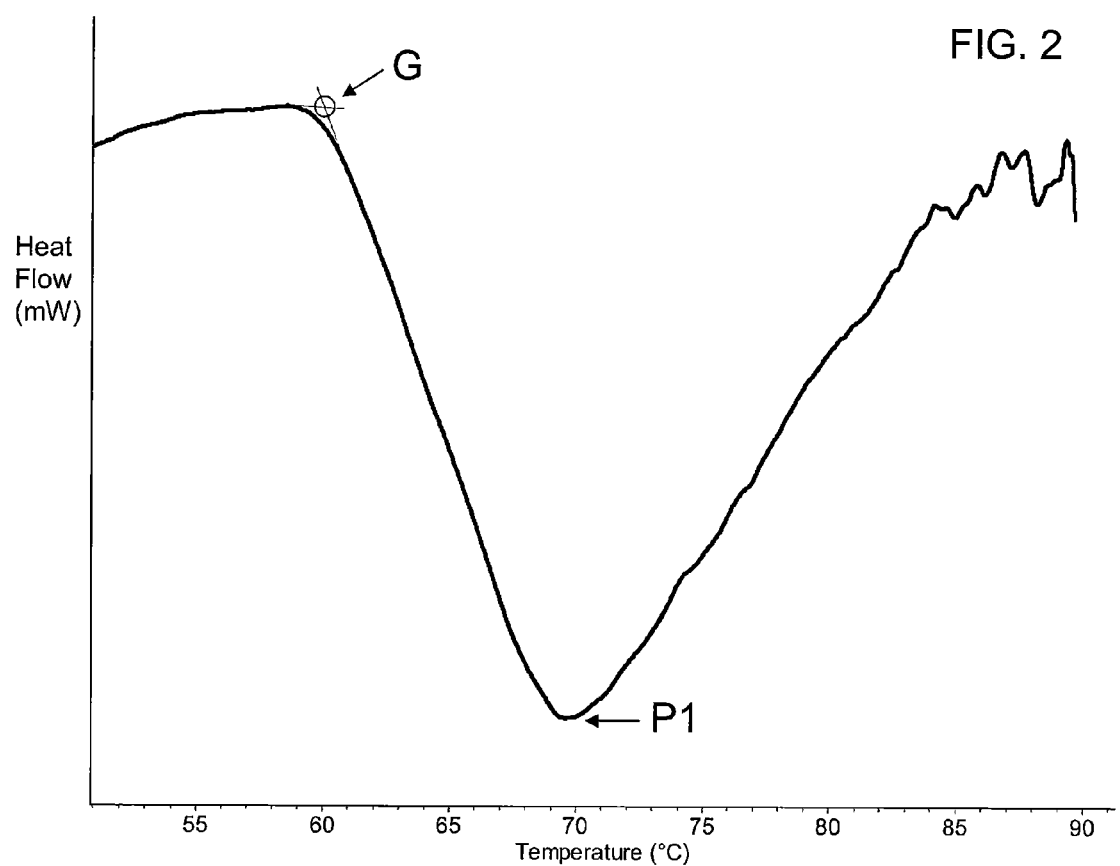
FIG. 2 plots a micro-calorimetry dehydration thermal response fingerprint for another cellulose-based polymer using the micro-calorimetry test method disclosed herein.

A ceramic precursor batch composition was prepared having, as an ingredient, HPMC having a micro-calorimetry thermal response as shown in FIG. 2. The composition had a gelation onset temperature G of 60.03° C. and a single peak P1 having a maximum intensity at a temperature of 69.599° C. The composition was shown to have a $T_{onset}$ of 35.05° C.

Example 2

Figure 3:
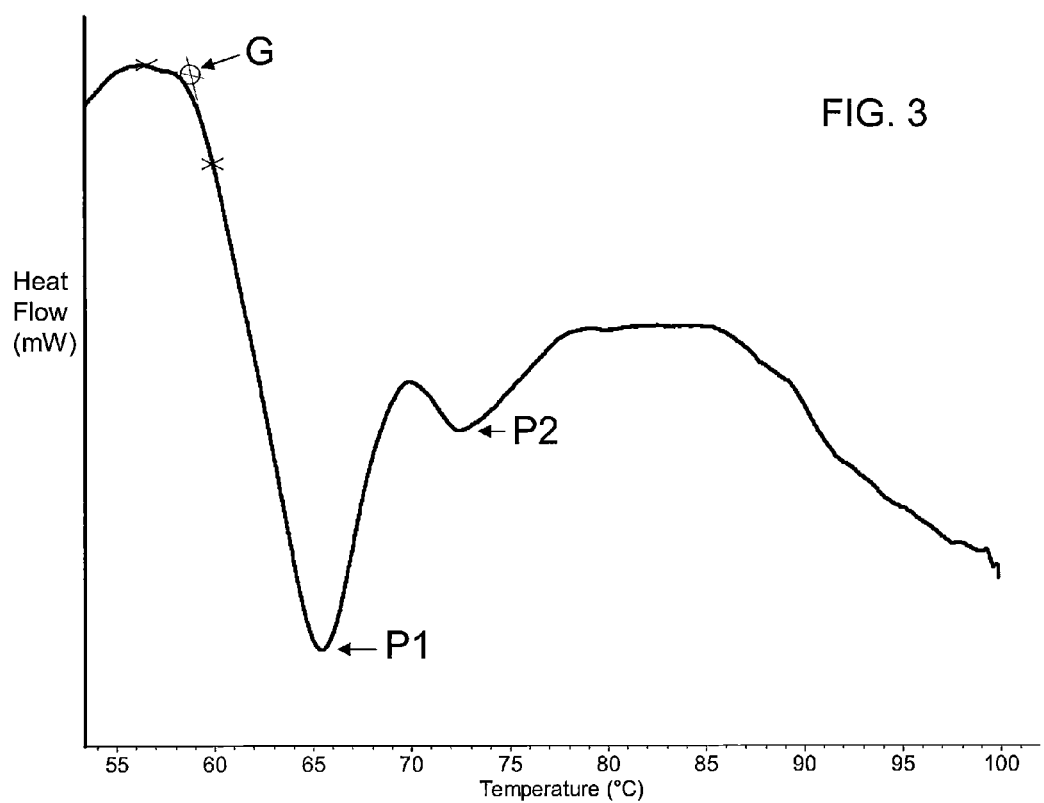
FIG. 3 plots a micro-calorimetry dehydration thermal response fingerprint for another cellulose-based polymer using the micro-calorimetry test method disclosed herein.

A ceramic precursor batch composition was prepared having, as an ingredient, HPMC having a micro-calorimetry thermal response as shown in FIG. 3. The composition had a gelation onset temperature G of 58.83° C. and first and second peaks, the first peak P1 having a maximum intensity at a temperature of 65.437° C. and a second peak P2 having a maximum intensity at a temperature of 72.248° C. The composition was shown to have a $T_{onset}$ of 34.74° C.

Example 3

Figure 6:
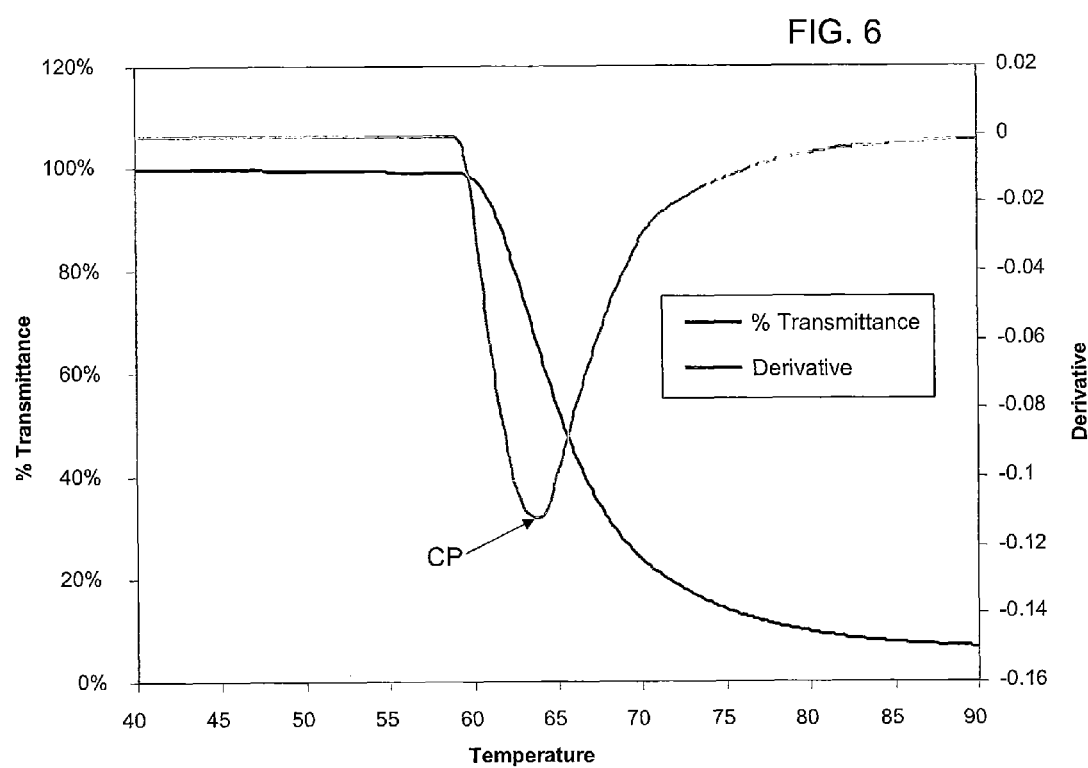
FIG. 6 plots curves used to determine cloud point for a cellulose-based polymer using the cloud point test method disclosed herein.

A ceramic precursor batch composition was prepared having, as an ingredient, HPMC having the cloud point curve shown in FIG. 6. The HPMC had a cloud point of 64.0° C. as indicated by CP on FIG. 6. The composition was shown to have a $T_{onset}$ of 35.5° C.

Comparative Example

Figure 7:
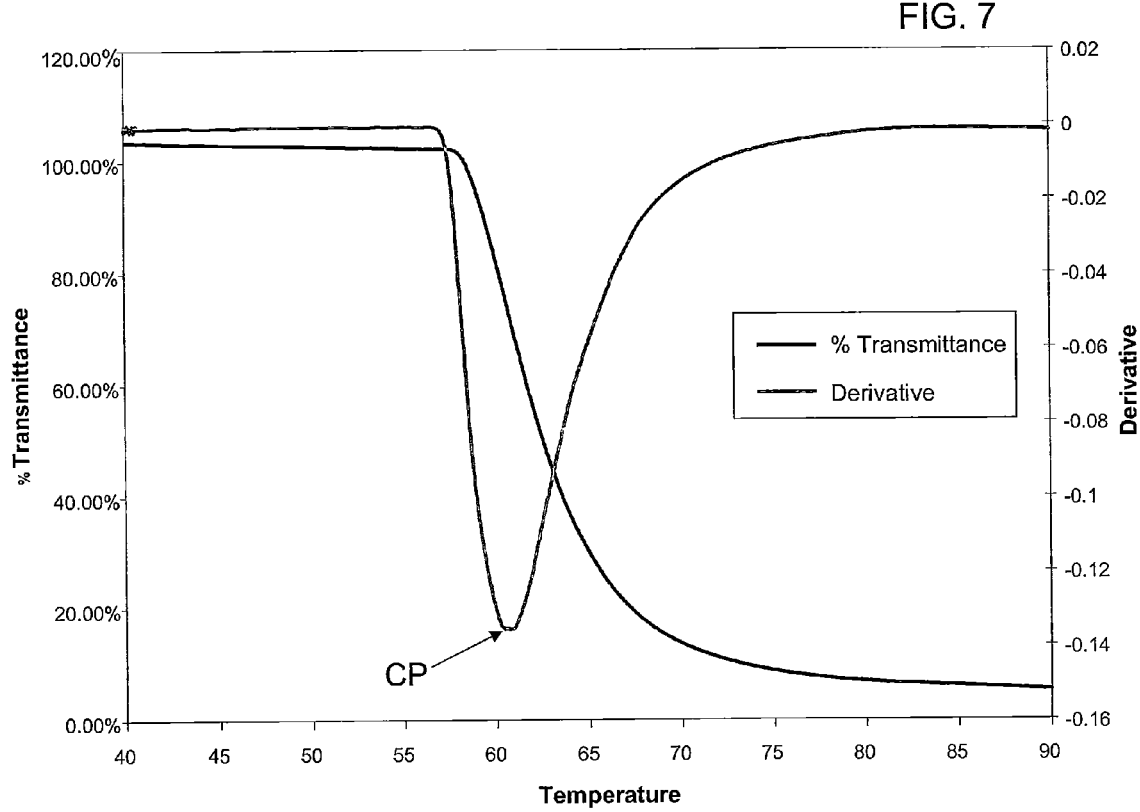
FIG. 7 plots curves used to determine cloud point for another cellulose-based polymer using the cloud point test method disclosed herein

A ceramic precursor batch composition was prepared having, as an ingredient, HMPC having the cloud point curve as shown in FIG. 7. The HPMC had a cloud point of 60.75° C. as indicated by CP on FIG. 7. The composition was shown to have a $T_{onset}$ of 31.9° C.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A ceramic precursor batch composition comprising:
    inorganic ceramic-forming ingredients and a cellulose-based polymer, wherein the cellulose-based polymer comprises a methylcellulose showing a micro-calorimetry thermal response comprising, upon dehydration, at least one endothermic peak above a gelation onset temperature, wherein the at least one peak comprises a peak having a maximum intensity at a temperature of at least 69° C.

2. The composition of claim 1, wherein the methylcellulose is a hydroxypropyl methylcellulose (HPMC).

3. The composition of claim 2, wherein the hydroxypropyl methylcellulose (HPMC) has a methoxy degree of substitution from about 1.6 to 2.0 and a hydroxypropyl molar substitution from about 0.10 to 0.25.

4. The composition of claim 1, wherein the composition further comprises a salt that is present in a solvent system containing the cellulose-based polymer, wherein the salt is present in the solvent system in a molar concentration of no greater than $1 \times 10^{-3}$.

5. The composition of claim 1, wherein the at least one endothermic peak comprises a first peak having a maximum intensity of at least 65° C. and a second peak having a maximum intensity of at least 70° C.

6. The composition of claim 1, wherein the gelation onset temperature is at least 60° C.

7. The composition of claim 1, wherein the at least one peak does not comprise a peak having a maximum intensity of less than 65° C.

8. The composition of claim 1, wherein the methylcellulose shows a micro-calorimetry thermal response comprising, upon rehydration, at least one exothermic peak below a transition onset temperature, wherein the at least one peak comprises a peak having a maximum intensity at a temperature of at least 48° C.

9. The composition of claim 1, wherein at least 50% of the cellulose based polymer in the composition comprises a methylcellulose showing a micro-calorimetry thermal response comprising, upon dehydration, at least one endothermic peak above a gelation onset temperature, wherein the at least one peak comprises a peak having a maximum intensity at a temperature of at least 69° C.

10. A ceramic precursor batch composition comprising:
   inorganic ceramic-forming ingredients and a cellulose-based polymer, wherein the cellulose-based polymer comprises a methylcellulose having a cloud point above 62° C.

11. The composition of claim 10, wherein the methylcellulose is a hydroxypropyl methylcellulose (HPMC).

12. The composition of claim 10, wherein the methylcellulose shows a micro-calorimetry thermal response comprising, upon dehydration, at least one endothermic peak above a gelation onset temperature, wherein the at least one peak comprises a peak having a maximum intensity at a temperature of at least 69° C.

13. The composition of claim 10, wherein the methylcellulose shows a micro-calorimetry thermal response comprising, upon rehydration, at least one exothermic peak below a transition onset temperature, wherein the at least one peak comprises a peak having a maximum intensity at a temperature of at least 48° C.

14. The composition of claim 10, wherein at least 50% of the cellulose based polymer in the composition comprises a methylcellulose having a cloud point above 62° C.

15. A method of producing a ceramic precursor batch composition, the method comprising compounding:
   inorganic ceramic-forming ingredients; and
   a cellulose-based polymer;
   wherein the cellulose-based polymer comprises a methylcellulose showing a micro-calorimetry thermal response comprising, upon dehydration, at least one endothermic peak above a gelation onset temperature, wherein the at least one peak comprises a peak having a maximum intensity at a temperature of at least 69° C.

16. The method of claim 15, wherein the methylcellulose is a hydroxypropyl methylcellulose (HPMC).

17. The method of claim 16, wherein the hydroxypropyl methylcellulose (HPMC) has a methoxy degree of substitution from about 1.6 to 2.0 and a hydroxypropyl molar substitution from about 0.10 to 0.25.

18. The method of claim 15, wherein the at least one peak comprises a first peak having a maximum intensity of at least 65° C. and a second peak having a maximum intensity of at least 70° C.

19. The method of claim 15, wherein the gelation onset temperature is at least 60° C.

20. The method of claim 15, wherein the methylcellulose has a cloud point above 62° C.

* * * * *